Patented Oct. 29, 1940

2,219,777

UNITED STATES PATENT OFFICE 2,219,777

PROCESS OF MAKING PARCHED CORN

Albert F. Holloway and Robert Lee Goodin, Oakland, Calif., assignors to Olin Manufacturing Co., Oakland, Calif., a corporation of California No Drawing. Application July 15, 1938, Serial No. 219,406

7 Claims. (Cl. 99—80)

The invention relates to cereal food products and methods and processes of preparing same and more particularly to an edible corn product and process of making.

An object of the present invention is to provide a commercial process for making a corn food product having the true flavor of parched corn as distinguished from fried corn or hominy.

Another object of the invention is to provide a new food product which is tasty, digestible and nourishing.

A further object of the invention is to provide a new corn product and process of making same, wherein a corn kernel is cooked and prepared in a manner providing an improved appearance and texture and a crunchy construction of medium hardness.

The invention possesses other objects and features of advantage, some of which, with the foregoing, will be set forth in the following description of the preferred form of the invention. It is to be understood, however, that variations in the showing made by the said description may be adopted within the scope of the invention as set forth in the claims.

The process of the present invention consists briefly in soaking dry corn kernels in water, adding a caustic to loosen the outer skin of the kernel, washing to remove the skin and caustic, and then cooking in deep hot oil. As an important feature of the present invention we cause by an initial soaking of the kernel in water an exclusion of the caustic from the interior of the kernel and the production of a smooth, unbroken surface on the kernel immediately underlying the skin which is not substantially penetrated by the caustic. In this manner when the kernel is washed and cooked in deep fat or oil, a smooth, hard, glazed and unbroken surface is provided on the kernel which forms a substantially complete and sealed envelope for the interior of the kernel.

We have found that the construction of a corn kernel consists in a central core or kernel portion and an outer skin. Further, we have found that the texture of the kernel core is progressively harder from the center to the outside and thus the surface immediately underlying the skin is the hardest and densest part of the kernel core. We have found that by soaking and heating the kernel in a proper amount of water for a period sufficient to cause a substantial saturation thereof prior to the addition of the caustic and by controlling the alkaline strength of the solution after addition of the caustic, only the outside skin of the kernel will be attacked and the under external surface of the core left substantially completely intact. In this feature our method of preparing corn for parching differs from methods used in making hominy, since in our process the hard, outer surface of the kernel core is not ruptured. If this surface is ruptured, as may be the case if the chemical used to remove the skin is allowed to penetrate the kernel, the compounds used in the parching operation will penetrate the kernel through such ruptures and the resulting product will have the flavor of fried corn or hominy, rather than true parched flavor.

In accordance with our process, the dry corn kernels are immersed in a water bath at ordinary room temperature in the proportion of approximately five hundred pounds of corn to one hundred and forty gallons of water, and slowly heated for about one to two hours, during which time the temperature of the water is raised to approximately 150° F. to 160° F. Preferably, this initial period is approximately one and one-half hours and the temperature attained about 155° F. We have found that when this proportion of corn and water are mixed, and the bath heated as above, the water will penetrate the kernels and provide an effective buffer for the repelling of caustic or other chemical from the core of the kernel when the chemical is added to remove the outer skin. Where the chemical was placed in the water at the start of the cooking and soaking operation, as is done in the making of hominy, the chemical would penetrate into the kernels along with the water, making it necessary to soak and wash the kernels for a considerable time to remove the chemical and also causing a rupturing of the outer surface of the kernel core, which is undesirable in the present process.

After this initial period of heating and soaking the kernels in water, a suitable chemical is added for removing of the skins. We prefer to use caustic soda and this compound is added in a proportion of approximately sixteen and one-half pounds of caustic soda to five hundred pounds of the corn, or approximately 1 part caustic soda to 30.3 parts corn. The introduction of the caustic soda to the corn-in-water bath is preferably effected by first solubilizing the caustic soda in water, which is then added to the bath in solution form. For each five hundred pounds of corn, sixteen and one-half pounds of caustic soda is thoroughly mixed in five gallons of cold water and after the solution has quieted down, the same is added to and mixed with the water and corn. The new mixture is then further heated for about one-half hour to slowly raise the temperature to approximately 170° F. to 180° F., a temperature of about 175° F. being preferably used. The supply of heat is then terminated and the batch allowed to cool for about one hour, during which time the same is thoroughly stirred at regular intervals of approximately about fifteen minutes, to keep the heat uniform and to assist in loosening of the skins. By this time the skins are loosened to such an extent that stirring of the kernels in clear cold water will remove the skins from the kernels, leaving a hard, glazed surface under the skins, which surface is smooth and intact. Preferably, the latter operation of removing the skins in clear, cold water is effected by the continuous application of fresh water to the bath until the skins are removed and the alkali diluted and removed. By reason of the substantial confinement of the alkali to the outer skin, its removal is readily effected and without substantial effort practically all trace of the alkali is removed. This is of importance, due to the fact that the presence of such alkali during the cooking of the kernels in deep, hot oil would cause the formation of soap, which even in traces is readily detectable in the taste of the final product.

After the kernels have been washed as above, they are preferably allowed to drain for several hours in order to remove the excess water. We prefer to drain the kernels for approximately twelve hours, although this draining period may be less or greater than this period of time.

After draining, the kernels contain approximately 33% moisture and are ready for parching. We prefer, as aforementioned, to parch the kernel by cooking the same in hot, deep fat or oil, preferably of vegetable origin, and the kernels are preferably placed in baskets and submerged in the deep fat at a temperature of approximately 350° F. to 400° F. for about seven to eight and one-half minutes. At a temperature of 375° F. a cooking period of seven and one-half minutes is preferred. The submerging of the kernels with their smooth, hard and unbroken surfaces in the high temperature oil causes the outer surface of the kernel to seal, and a true parch is obtained in contrast to a fry, as is the case where the frying compound is allowed to penetrate into the kernels through ruptures or other perforate or porous portions of the outer surface caused by too much penetration of the caustic used in removing the skins.

The baskets of cooked kernels are preferably removed from the hot oil bath and allowed to drain and by reason of the self-contained heat of the kernels and the heat in the adhering heated oil, the cooking operation will continue and is preferably allowed to do so for about seven and one-half minutes longer when the kernels are deposited on a cooling and draining table to prevent over-cooking.

The above process is particularly applicable to field corn and preferably, a white field corn is used, since the yellow corn has a tendency to develop a sharp or bitter taste when cooked in deep hot oil. Substantially any variety of white field corn may be used, but we prefer to use a Texas white field corn for the reason that this corn is somewhat softer than the eastern white field corn. As a further important feature of the present invention we have found that the present process is also applicable with slight modification to sweet corn and in this case the white sweet corn is also preferably used. With sweet corn the initial proportions of corn and water are changed to increase the relative percentage of water, the preferred proportion being about four hundred pounds of white sweet corn to one hundred and fifty gallons of water. The amount of caustic is reduced due to the decreased weight and greater sensitiveness of the white sweet corn. We have found that a proportion of caustic soda of about fifteen pounds to four hundred pounds of corn is preferable. Further, in the hot oil cooking step the sweet corn must be processed at a lower finishing temperature. It is important to introduce the sweet corn into the hot oil with a temperature of the latter at approximately 375° F. and as the batch of corn is introduced, the oil temperature decreases and is held at a reduced temperature during cooking for approximately seven and one-half minutes when the corn is removed with the oil temperature at approximately 345° F. This lower finishing temperature of the sweet corn is necessary to prevent burning or charring of the sugar content of the corn.

The article thus produced by either process is enlarged over the original corn kernel and possesses a smooth and glazed outer surface of brownish color and is a delicious, tasty food product having the true flavor and crunchy texture of parched corn.

We claim:

1. The process of making parched corn which consists in first soaking and heating dry field corn kernels in water starting at normal room temperature and in the proportion of approximately five hundred pounds of field corn to one hundred and forty gallons of water for a period of from one to two hours, adding caustic soda in a proportion of approximately sixteen and one-half pounds of caustic soda to five hundred pounds of corn and allowing said caustic soda to act on said corn at a temperature of approximately 175° F. for a time sufficient only to loosen the outer skins of the kernels without substantially breaking the crust thereunder, washing to remove the skins and caustic, and cooking in hot oil.

2. The process of making parched corn from dry sweet corn which consists in first soaking and heating the dry sweet corn kernels in water starting at normal room temperature and in the proportion of approximately four hundred pounds of corn to one hundred and fifty gallons of water for a period of from one to two hours, adding caustic soda in a proportion of approximately fifteen pounds of caustic soda to four hundred pounds of corn and allowing the caustic to act on said corn at a temperature of approximately 175° F. for a period sufficient only to loosen the outer skins of the kernels without substantially breaking the crust thereunder, washing to remove the skins and caustic, and cooking in hot oil.

3. In the process of making parched corn from dry field corn kernels by removing the skin of the corn kernels with a caustic and cooking said kernels in hot oil, that step prior to the application of the caustic which consists in soaking and heating the corn kernels in water from a temperature of approximately 60° to 80° F. to a temperature of approximately 150° to 160° F. in the proportion of approximately five hundred pounds of corn to one hundred and forty gallons of water for a period between one and two hours.

4. In the process of making parched corn from dry field corn kernels by removing the skin of the corn kernels with a caustic and cooking said kernels in hot oil, that step which consists in soaking the corn kernels in water in the proportion of approximately five hundred pounds of corn to one hundred and forty gallons of water for approximately one to two hours while slowly heating the water to a temperature of approximately 150° F. to 160° F. prior to the application of the caustic.

5. In the process of making parched corn from dry sweet corn kernels by removing the skin of the kernels with a caustic and cooking said kernels in hot oil, that step which consists in soaking the corn kernels in water in the proportion of approximately four hundred pounds of corn to one hundred and fifty gallons of water for approximately one to two hours while slowly heating the water to a temperature approximately 150° F. to 160° F. prior to the application of the caustic.

6. The process of making parched field corn which consists in immersing dry corn kernels in water in the proportion of approximately five hundred pounds of corn to one hundred and forty gallons of water, slowly heating the water for approximately one to two hours to a temperature of approximately 150° F. to 160° F., adding a solution of caustic soda in proportion of approximately sixteen and one-half pounds of caustic soda to approximately five hundred pounds of corn, continuing to heat for approximately one-half hour with a slowly rising temperature to approximately 170° F. to 180° F., cooling and stirring the mixture for approximately one hour, thoroughly washing the kernels to remove skin and caustic, draining the kernels, and cooking the kernels in deep oil having a temperature of approximately 375° F. for approximately seven and one-hour minutes.

7. The operation of making parched corn from sweet corn kernels which consists in immersing dry sweet corn kernels in water in the proportion of approximately four hundred pounds of corn to one hundred and fifty gallons of water, slowly heating the water for approximately one to two hours to a temperature of approximately 150° F. to 160° F., adding a solution of caustic soda in proportion of approximately fifteen pounds caustic soda to approximately four hundred pounds of corn, continuing to heat for approximately one-half hour with a slowly rising temperature to approximately 170° F. to 180° F., cooling and stirring the mixture for approximately one hour, thoroughly washing the kernels to remove skin and caustic, draining the kernels, and cooking the kernels in deep oil having a temperature of approximately 375° F. on addition of the kernels to the oil and cooking at a reduced temperature for approximately seven and one-half minutes and removing said kernels from the oil at a temperature of approximately 345° F.

ALBERT F. HOLLOWAY.
ROBERT LEE GOODIN.